United States Patent [19]

Hertz

[11] Patent Number: 4,484,125
[45] Date of Patent: Nov. 20, 1984

[54] THREE-PHASE DELTA-WOUND MOTOR OPERATED FROM SINGLE-PHASE CURRENT

[75] Inventor: Claude M. Hertz, Nokomis, Ill.

[73] Assignee: Ronk Electrical Industries, Inc., Nokomis, Ill.

[21] Appl. No.: 220,378

[22] Filed: Dec. 29, 1980

Related U.S. Application Data

[63] Continuation of Ser. No. 963,446, Nov. 24, 1978, abandoned.

[51] Int. Cl.³ .............................................. H02P 1/44
[52] U.S. Cl. .................................... 318/768; 318/817
[58] Field of Search ............... 318/768, 816, 817, 773, 318/774, 776, 777; 310/185, 211; 363/150

[56] References Cited

U.S. PATENT DOCUMENTS

| | | |
|---|---|---|
| 602,911 | 4/1898 | Steinietz . |
| 771,293 | 10/1904 | Averrett . |
| 1,780,395 | 11/1930 | Kennedy . |
| 1,912,337 | 5/1933 | Kennedy ............................. 318/817 |
| 2,922,942 | 1/1960 | Steelman . |
| 3,202,896 | 8/1965 | Lewus . |
| 3,566,226 | 2/1971 | Tamm ................................. 318/768 |
| 3,588,649 | 6/1971 | Heine et al. ......................... 318/774 |
| 3,670,238 | 6/1972 | Ronk ................................... 310/211 |
| 3,970,907 | 7/1976 | Myers . |
| 4,158,225 | 6/1979 | Hertz .................................. 310/211 |

FOREIGN PATENT DOCUMENTS 473796  5/1937  United Kingdom ................ 318/768

OTHER PUBLICATIONS

Bulletin Has 4, Steelman Electric Mfg. Co., Kilgore, Texas.
Veinott, C. G., *Theory and Design of Small Electric Motors*, McGraw Hill, 1959, pp. 135–140.

*Primary Examiner*—David Smith, Jr.
*Attorney, Agent, or Firm*—Senniger, Powers, Leavitt and Roedel

[57] ABSTRACT

A three-phase delta-wound motor adapted for operation from a source of single-phase current, which motor includes first and second terminals adapted to be connected to the single-phase current source and substantially identical first, second, and third phase windings. A capacitor and the first and second phase windings are series-connected one with the other across the first and second terminals, the polarity of the first winding with respect to the second winding being opposite that of a normal delta-wound motor. The third phase winding is connected directly across the first and second terminals in parallel with the serially-connected capacitor and first and second phase windings.

10 Claims, 3 Drawing Figures

THREE-PHASE DELTA-WOUND MOTOR OPERATED FROM SINGLE-PHASE CURRENT

This is a continuation of application Ser. No. 963,446, filed Nov. 24, 1978 now abandoned.

BACKGROUND OF THE INVENTION

This invention relates to three-phase motors, and more particulary to a three-phase delta-wound motor adapted for operation from a source of single-phase current.

In many rural areas, the demand for three-phase motors has increased dramatically because of the increasing mechanization and electrification of the farm. Many tasks which formerly were performed by hand are now performed by electrical motors, and many of these tasks require a large (i.e., 25+) amount of horsepower. As a practical matter, the only motors widely available in the larger horsepower sizes are three-phase delta-wound motors. Unfortunately, many rural areas do not have three-phase power service and the cost of extending this service to those areas is often prohibitive.

Some systems have been devised to address the problem of running three-phase motors where only single-phase current is available. For example, rotary converters are used on the farm to convert single-phase power to three-phase power. But if only a single three-phase motor is to be used, the cost of a rotary converter may not be economically justifiable. Static converters are often used to run individual three-phase motors from a single-phase source, but present static converters are also not without their limitations. An example of such a static converter system is described in U.S. Pat. No. 2,922,942. That particular system, however, is directed to three-phase wye-connected motors and is not useable with 240 V delta-wound or connected motors.

A further difficulty in using large horsepower motors in rural areas is that the maximum current available is relatively low. Although the amount of current available is usually sufficient to run even large (e.g. 50 hp) three-phase motors, it is often not enough to start such a motor. Motors such as that described in U.S. Pat. No. 2,922,942 typically require a starting current that is five to six times greater than the running current. Because of this, many rural power companies will not allow larger horsepower motors to be connected to their single-phase lines.

SUMMARY OF THE INVENTION

Among the several objects of the invention may be noted the provision of a three-phase delta-wound motor which may be operated from a source of single-phase current; the provision of such a motor which needs no rotary converter to be operated on single-phase current; the provision of such a motor which is operable from a 240 V single-phase current source; the provision of such a motor which has a starting current lower than normal motors; and the provision of such a motor which is economical to make and reliable in use.

Briefly, a motor of this invention comprises first and second terminals adapted to be connected to a source of single-phase current, substantially identical first, second and third phase windings, and a capacitor. The capacitor and the first and second phase windings are series-connected one with the other across the first and second terminals, the polarity of the first winding with respect to the second winding being opposite that of a normal delta-wound motor, i.e., the polarity of the first winding at the point of connection with the second winding being the same as the polarity of the second winding at that point. The third phase winding is connected directly across the first and second terminals in parallel with the serially-connected capacitor and first and second windings.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
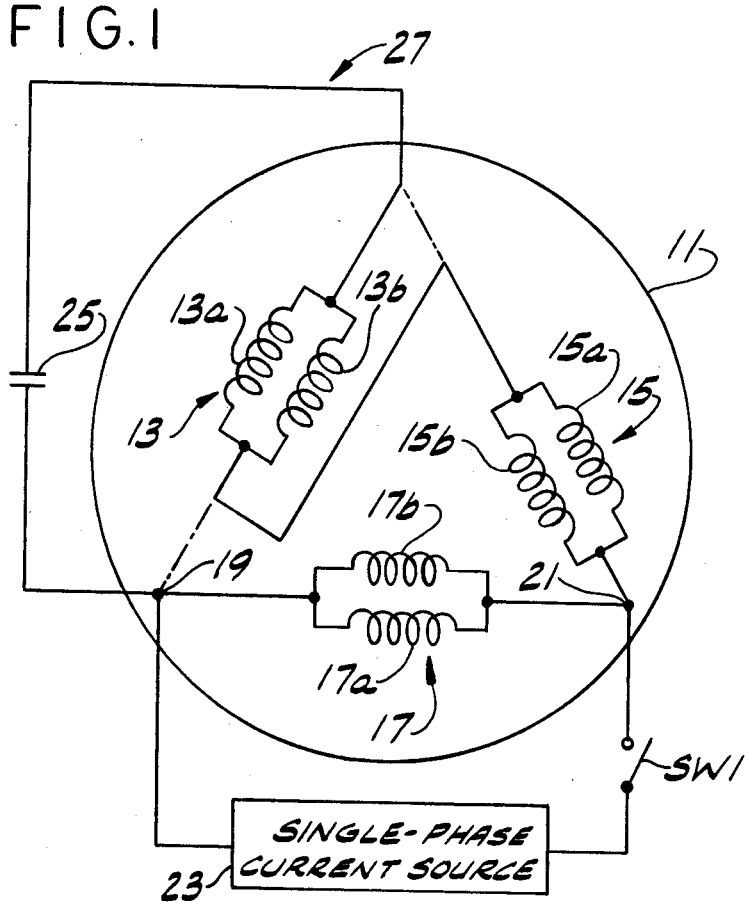
FIG. 1 is a schematic circuit diagram of a three-phase delta-wound motor adapted for operation in accordance with the present invention from a source of single-phase current.

Referring now to the drawings, there is shown in FIG. 1 a three-phase delta-wound motor 11 having identical first, second and third phase windings 13, 15 and 17. The windings are symmetrically oriented with respect to each other physically, and when connected as shown in phantom for operation from three-phase current they are symmetrically oriented electrically as well. Each winding preferably comprises two separate coils or winding sections: winding 13 being constituted by two coils 13a and 13B, winding 15 by two coils 15a and 15b, and winding 17 by two coils 17a and 17b. Motor 11 also includes two terminals 19 and 21 which in operation are connected through an ON-OFF switch SW1 to a source of single-phase current 23, such as a rural electrical transmission line.

Figure 3:
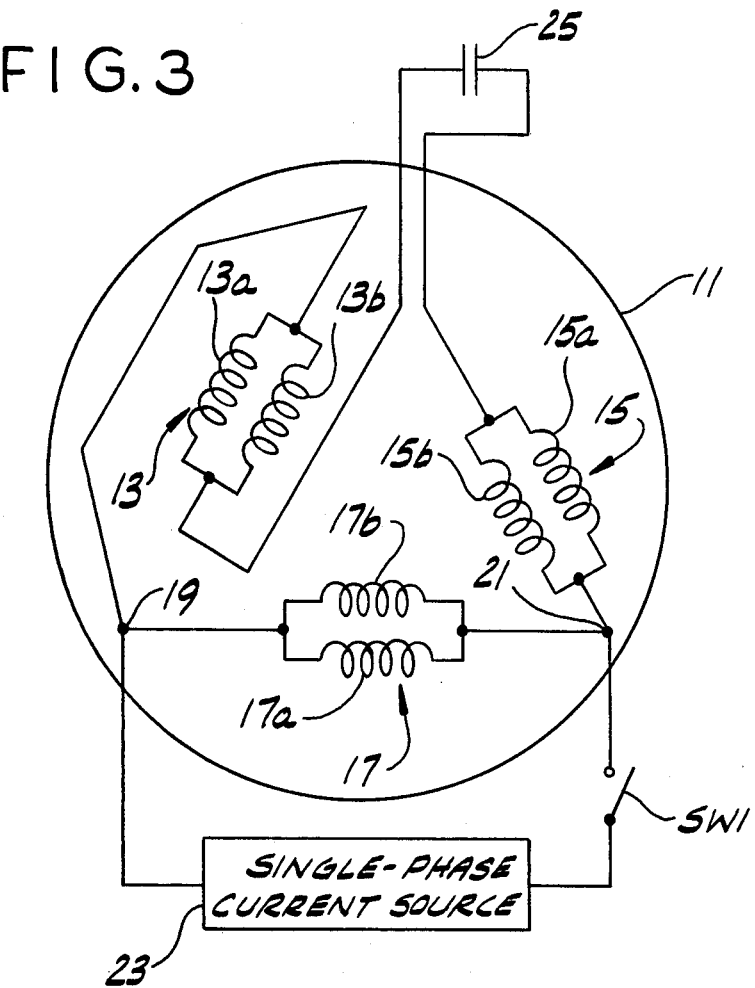
FIG. 3 is a schematic circuit diagram of a three-phase delta-wound motor of the present invention adapted somewhat differently from the motor of FIG. 1 for operation from a source of single-phase current.

When connected as shown in phantom in FIG. 1, i.e., in the normal delta configuration, motor 11 cannot be efficiently operated on a single-phase current. It has been found, however, that by reconnecting three-phase delta-wound motor 11 as shown in FIG. 1 or as shown in FIG. 3, efficient single-phase operation is achieved. Note that as reconnected the polarity of winding 13 with respect to winding 15 is reversed from that of a normal delta-wound motor. That is, as reconnected the polarity of winding 15 at the point of connection with winding 13 is the same as the polarity of winding 13 at that point whereas in the normal connection the polarities of windings 13 and 15 at the point of connection differ. Referring specifically to FIG. 1, a capacitor 25 (e.g., having a capacitance of 250 μF for a 25 hp motor) is connected between terminal 19 and winding 13, and winding 15 is connected to terminal 21 as shown to form a series circuit consisting of capacitor 25 and windings 13 and 15 across terminals 19 and 21. Winding 17 is connected directly across these terminals in parallel with said series circuit. Capacitor 25 causes a phase shift in the current in the series circuit with respect to the current in winding 17 thereby setting up a rotating magnetic field in motor 11.

An alternative modification of motor 11 to adapt it for operation on single-phase current is shown in FIG. 3. In this modification, winding 13 is directly connected to terminal 19, its polarity with respect to windings 15 and 17 being opposite that of a normal three-phase delta-wound. Capacitor 25 is directly connected between windings 13 and 15. And winding 15 is connected to terminal 21 thereby completing the serial connection of windings 13 and 15 and capacitor 25 across the terminals. The operation of this modification of motor 11 is substantially the same as that of the modification of motor 11 shown in FIG. 1.

It will be understood that an additional capacitor may be advantageously utilized to aid in starting. Such a capacitor (not shown in FIGS. 1 and 3, but illustrated at 39 in FIG. 2) is shunt connected across capacitor 25 in a circuit which is opened to disconnect this starting capacitor when the motor attains running speed.

Figure 2:
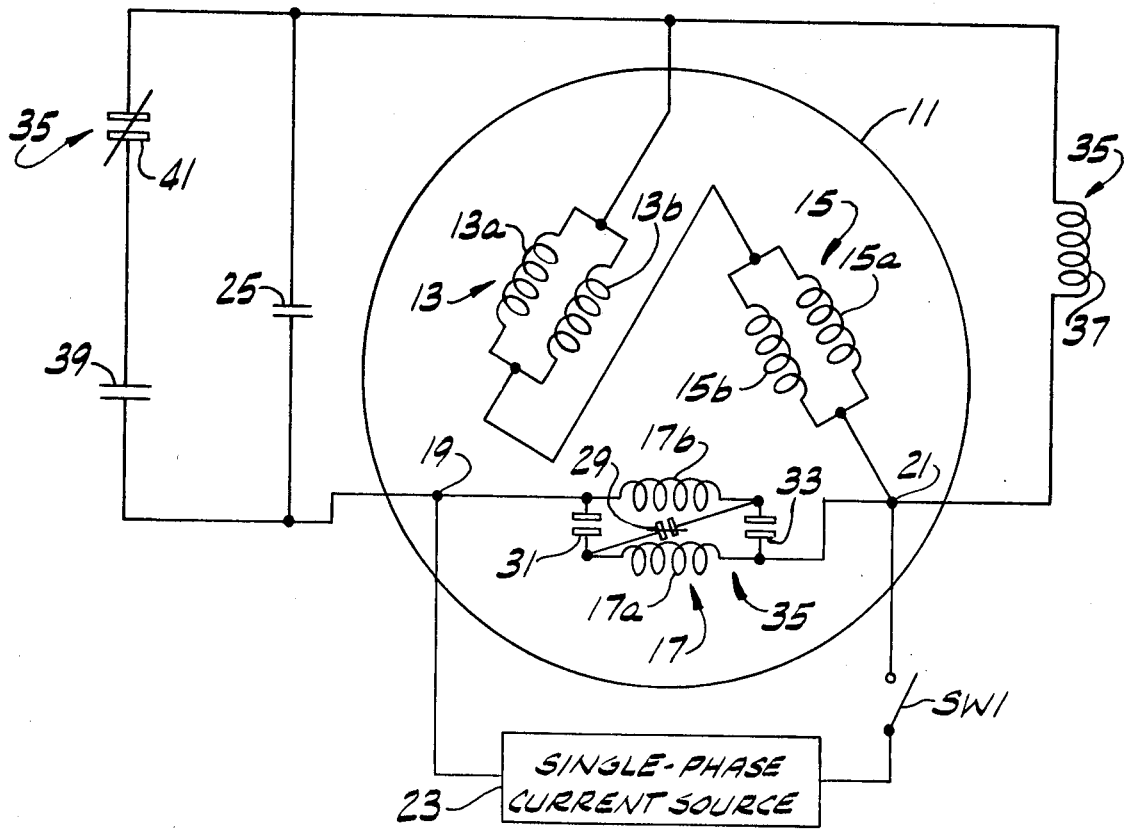
FIG. 2 is a schematic circuit diagram of a three-phase delta-wound motor adapted for operation in accordance with the present invention from a source of single-phase current and which requires less than normal starting current.

Further modifications to motor 11 which permit starting of the motor with lower than normal starting current are shown in FIG. 2. Specifically, a normally closed set of contacts 29 is connected between coils 17a and 17b to normally connect these coils in series across terminals 19 and 21 during starting of the motor, one end of coil or winding section 17a being connected to terminal 21 and the opposite end of winding section 17b being connected to terminal 19. Since the coils 17a and 17b are in series during starting rather than in parallel, the current through winding 17 is significantly reduced. When motor 11 substantially reaches operating speed, contacts 29 are opened and coils 17a and 17b are reconnected in parallel by means of two sets of normally (i.e., during starting) open contacts 31 and 33 which connect respective ends of coils 17a and 17b. Although several ways of opening contacts 29 and closing contacts 31 and 33 upon the attainment of operating speed are known, it is preferred that these contacts be part of a voltage-sensitive relay 35 having its coil, designated 37, connected across windings 13 and 15, relay 35 being sensitive to the back emf across those windings. Thus, relay 35 constitutes means for opening contacts 29 and closing contacts 31 and 33 when the motor reaches a predetermined speed, viz., operating speed.

Typically an additional starting capacitor 39 is used to aid in starting motor 11. This capacitor drops out of the circuit once motor 11 reaches running speed. When relay 35 is used with motor 11, additional capacitor 39 is easily connected into the circuit by means of a normally closed set of contacts 41 of relay 35. During starting, capacitor 39 is connected through normally closed contacts 41 to motor 11, but once operating speed is reached, contacts 41 open and capacitor 39 is effectively removed from the circuit.

In view of the above, it will be seen that the several objects of this invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A three-phase delta-wound motor adapted for operation from a source of single-phase current comprising first and second terminals adapted to be connected to said source, substantially identical first, second and third phase windings, and a capacitor, said capacitor and said first and second phase windings being series-connected one with the other, the polarity of the first winding at the point of connection with the second winding being the same as the polarity of the second winding at that point, said capacitor and first and second phase windings being series-connected across the first and second terminals, said third phase winding being connected directly across the first and second terminals in parallel with the serially-connected capacitor and the first and second phase windings.

2. A motor as set forth in claim 1 wherein the third phase winding includes a first winding section and a second winding section, further including a normally closed set of contacts connected between the first and second winding sections of the third phase winding thereby normally connecting said winding sections in series one with the other, one end of said first winding section of the third phase winding being connected to the first terminal and the opposite end of the second winding section of the third phase winding being connected to the second terminal thereby normally connecting said first and second winding sections in series across the first and second terminals.

3. A motor as set forth in claim 2 including two sets of normally open contacts, one of the normally open sets of contacts being connected between one end of the first winding section of the third phase winding and the corresponding end of the second winding section of the third phase winding and the other normally open set of contacts being connected between the opposite end of said first winding section and the corresponding end of said second winding section, said motor further including means for opening said normally closed set of contacts and for closing said normally open sets of contacts when the motor reaches a predetermined speed, whereby when said predetermined speed is reached the normally open sets of contacts are closed and the normally closed set of contacts is opened, thereby connecting the first and second winding sections of the third phase winding in parallel with each other across the first and second terminals.

4. A motor as set forth in claim 3 wherein each phase winding comprises first and second winding sections, the first and second winding sections of the first phase winding being connected in parallel with each other to form said first phase winding and the first and second winding sections of the second phase winding being connected in parallel with each other to form said second phase winding.

5. A motor as set forth in claim 3 wherein said opening and closing means is a relay and wherein the normally closed set of contacts and the normally open sets of contacts are contacts of said relay.

6. A motor as set forth in claim 1 wherein the first and second phase windings are directly connected in series one with the other, the capacitor is directly connected in series between the first terminal and the first phase winding, and the second phase winding is directly connected to the second terminal.

7. A motor as set forth in claim 1 wherein the first phase winding is directly connected to the first terminal, the second phase winding is directly connected to the second terminal and the capacitor is connected between the first and second phase windings.

8. A method of converting a three-phase delta-wound motor for operation from a source of single-phase current, said motor having substantially identical first, second and third phase windings and having first and second terminals to be connected to said source, comprising the steps of:

connecting the first and second phase windings in series one with the other, the polarity of the first winding at the point of connection with the second winding being the same as the polarity of the second winding at that point;

serially connecting a capacitor and said first and second phase windings across said first and second terminals; and connecting the third phase winding across said first and second terminals in parallel with the serially-connected capacitor and first and second phase windings.

9. A method of converting a three-phase delta-wound motor for operation from a source of single-phase current, said motor having first and second terminals and having substantially identical first, second and third phase windings, each of said phase windings having first and second, winding sections, comprising the steps of:

connecting the first and second phase windings in series one with the other, the polarity of the first winding at the point of connection with the second winding being the same as the polarity of the second winding at that point;

serially connecting a capacitor and said first and second phase windings across the first and second terminals;

connecting the first and second winding sections of the third phase winding in series one with the other for starting of the motor;

connecting one end of the first winding section of the third phase winding to the first terminal;

connecting the opposite end of the second winding section of the third phase winding to the second terminal; and reconnecting the first and second winding sections of the third phase winding in parallel one with the other after the motor reaches a predetermined speed.

10. A method as set forth in claim 9 including the further steps of connecting a normally closed set of contacts between the first and second winding sections of the third phase winding to normally connect said winding sections in series one with the other, and connecting two sets of normally open contacts between the first and second winding sections of the third phase winding, one of the normally open sets being connected between one end of said first winding section and the corresponding end of said second winding section, the other of the normally open sets of contacts being connected between the opposite end of said first winding section and the corresponding end of said second winding section to connect said first and second winding sections in parallel with each other when said sets of normally open contacts are closed and said normally closed set of contacts is open.

* * * * *